United States Patent [19]
> Schade

[11] Patent Number: 4,700,670
[45] Date of Patent: Oct. 20, 1987

[54] OIL FILTER ADAPTER PROVIDING PARALLEL LOOP FLOW PATHS

[76] Inventor: Harvey R. Schade, 303 High St., P.O. Box 269, Edgerton, Wis. 53534

[21] Appl. No.: 828,032

[22] Filed: Feb. 10, 1986

Related U.S. Application Data

[63] Continuation-in-part of Ser. No. 512,249, Apr. 30, 1984, which is a continuation-in-part of Ser. No. 390,396, Jun. 21, 1982.

[51] Int. Cl.⁴ .............................................. F01M 1/00
[52] U.S. Cl. ................................. 123/196 A; 210/168
[58] Field of Search ........... 123/196 A; 210/DIG. 17, 210/120, 132, 133, 136, 168, 232, 240, 117

[56] References Cited

U.S. PATENT DOCUMENTS

| | | | |
|---|---|---|---|
| 3,250,242 | 5/1966 | Pekarek | 210/DIG. 17 X |
| 3,540,594 | 11/1970 | Sanderson | 210/232 |
| 4,268,384 | 5/1981 | Rosaen | 210/DIG. 17 X |
| 4,324,213 | 4/1982 | Kasting et al. | 123/196 A |
| 4,335,688 | 6/1982 | Diederich | 123/196 A |
| 4,406,784 | 9/1983 | Cochran | 210/232 |

Primary Examiner—E. Rollins Cross
Attorney, Agent, or Firm—Keith Schoff

[57] ABSTRACT

An adapter for use with internal combustion engine lubricating oil filter apparatus is provided for enabling a polishing filter of fine pore size to be placed in parallel flow arrangement with a full flow filter without jeopardizing the adequacy of filtered oil flow to the oil galleries of an engine.

6 Claims, 7 Drawing Figures

U.S. Patent  Oct. 20, 1987  Sheet 1 of 2  4,700,670
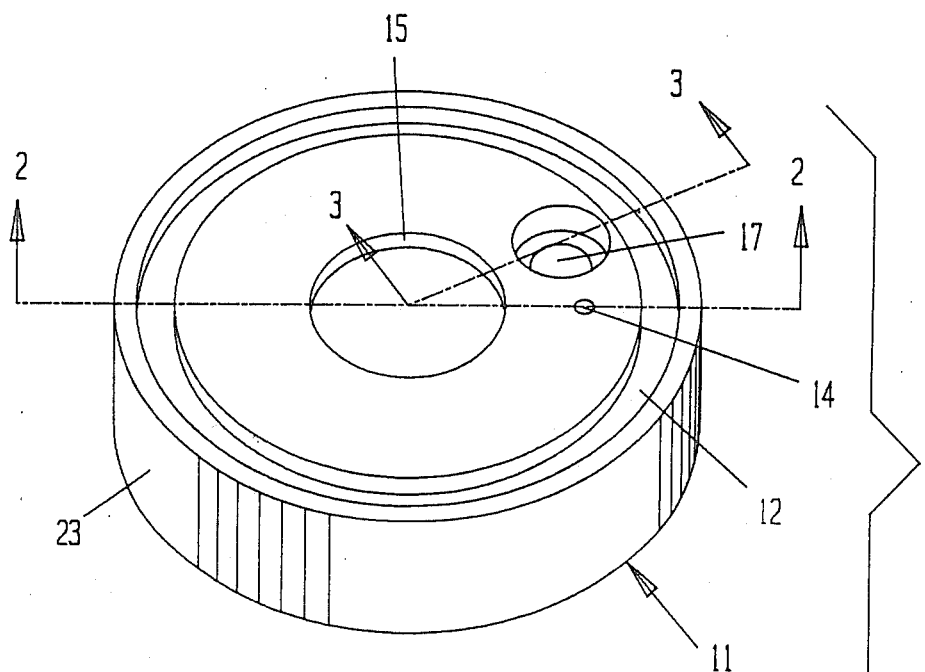
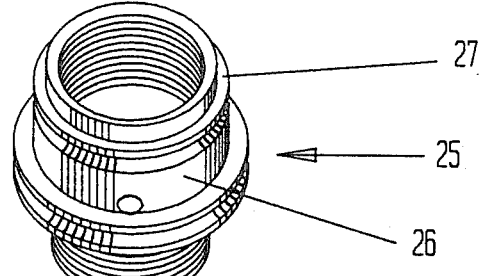
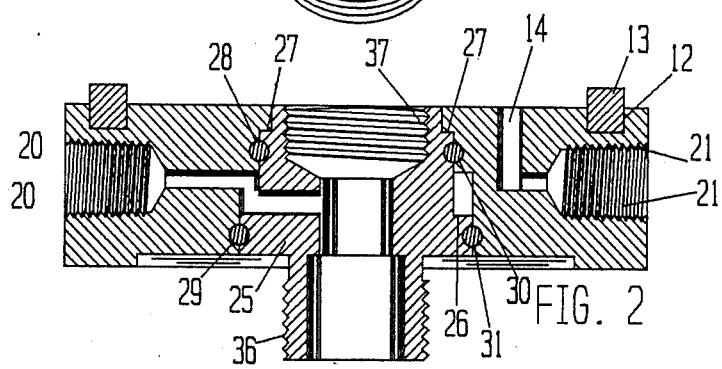
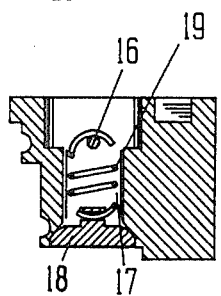
FIG. 1
FIG. 2
FIG. 3

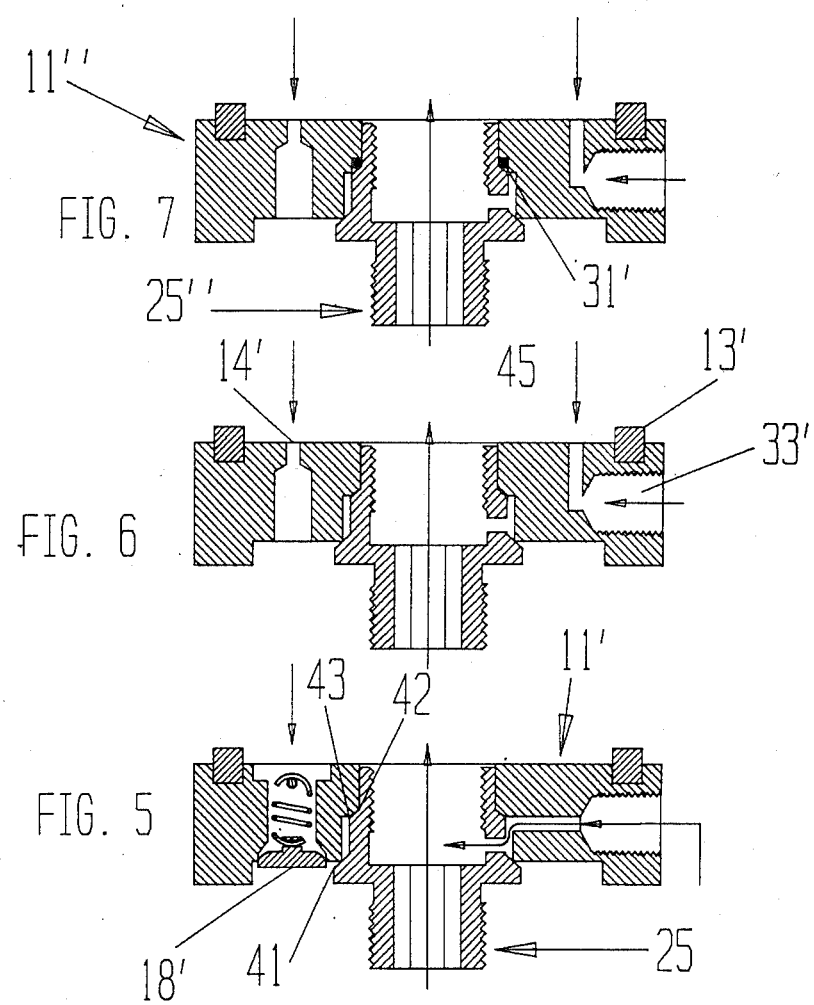
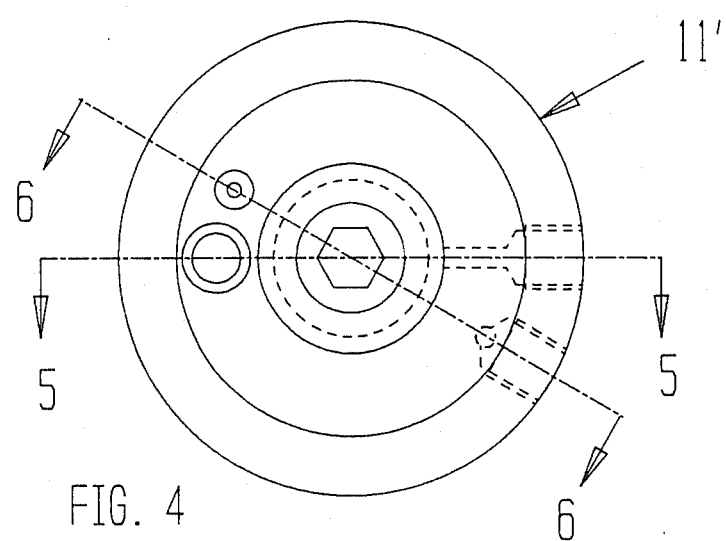

OIL FILTER ADAPTER PROVIDING PARALLEL LOOP FLOW PATHS

This application is a continuation-in-part of Ser. No. 512,249, filed Apr. 30, 1984, which is a continuation-in-part of Ser. No. 390,396 filed June 21, 1982.

BACKGROUND OF THE INVENTION

U.S. Pat. No. 3,540,594 discloses an adapter for internal combustion engine oil filtering apparatus which provides for lubricating oil flow in parallel paths to a full flow filter and to a limited flow by-pass filter, without however, providing for flow from the by-pass filter to the engine galleries, but rather to the engine crankcase. In consequence, if the full flow filter should impede flow more than the by-pass filter, whether by channeling flow occuring in the by pass filter or for other reason, an engine could receive inadequate flow of lubricating oil to the engine galleries.

SUMMARY OF THE INVENTION

An adapter is provided for use with internal combustion engine oil filtering apparatus which provides for return flow from both a full flow filter and a fine pore-size by-pass polishing filter provided in parallel path arrangement, to the oil galleries of an engine to insure adequate flow of lubricant in an engine.

BRIEF DESCRIPTION OF THE DRAWINGS

FIG. 1 is an exploded perspective view of a preferred embodiment of an adapter of this invention;

FIG. 2 is a cross sectional elevation of an assembled embodiment of FIG. 1 taken on line 2—2 of FIG. 1;

FIG. 3 is a cross sectional elevation of a portion of an assembled embodiment of FIG. 1 taken on line 3—3 of FIG. 1;

FIG. 4 is a bottom view of an assembled modified embodiment of the invention;

FIG. 5 is a cross sectional elevation of the embodiment of FIG. 4 taken on line 5—5 of FIG. 4 and shown in inverted position;

FIG. 6 is a cross sectional elevation of the embodiment of FIG. 4 taken on line 6—6 of FIG. 4 and shown in inverted position;

FIG. 7 is a cross sectional elevation of another embodiment of the invention.

DESCRIPTION OF THE INVENTION

Referrinb to FIGS. 1–3, adapter plate 11 is of disc configuration with annular groove 12 disposed in the upper surface thereof as portrayed for receiving sealing O-ring 13. The corresponding portion of the obverse face of plate 11 is planar and smooth for sealably receiving there against an O-ring substantially.

Filtered oil port 15 is disposed centrally in plate 11, and unfiltered oil ports 14 and 17 are disposed radially outward from port 15, port 17 being equipped with pressure relief valve 18 loaded by means of attached tension spring 19 which is anchored to pin 16. Valve 18 may comprise any suitable material such as chlorinated rubber material, for example, Neoprene ®, and spring 19 may be selected to exert a desired closure force on valve 18, which in a preferred embodiment is about eight pounds per square inch (p.s.i) of projected cross section of valve 18.

As shown in FIG. 2, radial passages 20, 21 communicate ports 14 and 15, respectively, to external environment through peripheral face 23 of plate 11. Threads 20', 21' are provided in the outer reaches of passages 20, 21, respectively, for receiving hose or tubing connection fittings in operable manner for enabling connection to be made to an accessory, by-pass polishing filter, not shown, with unfiltered oil feeding such by-pass filter through passage 21 and filtered oil being returned from such by-pass filter through passage 20.

Adapter bushing 25 is configured with a stepped outer diameter which provides shoulder 27 in faying contact with shoulder 27' of adapter plate 11. Circumferential grooves 28, 29 on bushing 25 operably receive sealing O-rings 30, 31, respectively. Passage 32 of calibrated size extends through the wall of bushing 25 and communicates filtered oil passage 20 from an accessory filter with filtered oil passage 15 from a primary, full flow disposable spin-on filter, neither of which filters is shown. Alternatively, or in addition, portion 33 of passage 21 might be of calibrated size, but such is not preferred. The purpose of calibrating the size of a passage is to provide a desired pressure drop through an accessory filter, particularly in relation to the pressure drop through a full flow filter, an optimal condition for the setting of spring tension for pressure relief valve 18 given above, being about twelve p.s.i. differential between passage 21 and passage 32 pressures with respect to a by-pass filter and about ten p.s.i. differential between passage 14 and passage 15 with respect to a full flow filter, such a condition insuring tha a preponderant portion of the flow passes through the full flow filter. Customarily, a full flow filter medium will have a pore size of about forty microns while a by-pass filter will incorporate a filter medium having a pore size of about one micron. The relative differentials in pressures across various passages and filter media will vary in accordance with well understood principle of physics such as Bernoulli's law and with engineering parameters relating to fluid flow such as Reynolds number. The provision of valve 18 and return flow from both filters to the oil gallaries of an engine insure adequate flow of lubrication to an engine under all conditions except where inadequate volume of lubricant or inadequate pump pressure fail to provide sufficient fluid head to the filtering apparatus.

Installation of the adapter of this invention is made by use of an Allen wrench sized to be operably received in hexagonal configured passage 35 of bushing 25, with the assembled bushing and adapter plate being wrenched firmly onto a threaded nipple provided for attaching an oil filter on an engine, O-ring 13 being sealably compressed by the operation. With the adapter plate, bushing and O-ring 13 firmly secured in place, connections are made by hose or tubing fittings being engaged with threads 20', 21' in passages 20, 21 to attach an accessory by-pass flow polishing filter to the adapter, the adapter plate being rotatable around bushing 25 if necessary to position the plate for convenience in making the connections. Threads 36 on bushing 25 are identical to those of a nipple provided on an engine for receiving a spin-on oil filter and which engage with threads 37 of bushing 25, and are provided for receiving a spin-on oil filter which would normally be installed in the manner of the adapter directly onto an engine. With a full flow oil filter sealably secured on the adapter nipple portion threads 36 and a sealing O-ring portion of the filter compressed against the surface of adapter plate 11, the installation is complete and may be put in service.

In FIGS. 4-6 adapter plate 11' and adapter bushing 25' are disposed in engagement without O-rings, gaskets or other sealing means interfacing the members, but rather chamfers 41, 42 are provided on adapter bushing 25' and chamfer 43 is provided on adapter plate 11' for operably sealing the members directly.

Passages 32' are provided through the wall of adapter bushing 25' without regard to the provision of flow control thereby, such control of flow distribution to filter media being provided by the restricted size of port 14', for example, about 3/32 inch diameter for use with automotive engines, in a preferred embodiment. Such port size constricts flow to assure adequate flow to the principal, large pore size filter for minimum engine lubrication, e.g. about one gallon per minute, at low oil pressure conditions, while forcing surplus flow to the auxiliary, fine pore size filter at higher pressure conditions, valve 18' being spring loaded to open at somewhat higher pressures than required for minimum flow through port 14'. In The embodiment of FIGS. 4-6, valve 18' may comprises metal, preferably a copper base alloy with passage 33' and port 45 providing for flow of unfiltered oil. Gasket 13' is shown as being of rectilinear cross section and may be preferred to an O-ring seal because it can be retained in place on adapter plate 11' readily and is less subject to being lost or misaligned during handling and assembly than an O-ring seal.

FIG. 7 shows another embodiment of the invention in a view similar to that of FIG. 6 with, however, bushing 25" being provided with O-ring 31 as a sealing means which replaces chamfers 42, 43 of the embodiment of FIGS. 4-6 for closing the annular interfacial passage between bushing 25" and adapter plate 11' in an upwardly direction as shown in the figure while retaining chamfer 41' as a sealing means making sealing contact with adapter plate 11" to close the passage in a downward direction as shown in the figure. The configuration of FIG. 7 renders the dimensional tolerance between chambers on bushing 25" non-critical as compared to that required for bushing 25' of FIGS. 4-6.

I claim:

1. An internal combustion engine oil filtration apparatus for providing parallel flow delivery to multiple filtering media from a single stream of unfiltered circulated oil and return flow in a combined stream of filtered oil from such media to oil galleries of an engine comprising an annular plate configured with an inner peripheral extremity and outer peripheral extremity wherein said inner peripheral extremity defines a central walled opening for receiving annular bushing means disposed to provide a port for filtered oil flow through said annular plate, said annular plate being further configured with at least one non-centrally disposed opening defining a port for unfiltered oil flow through said annular plate, said annular plate being further configured with a first oil flow passage and a second oil flow passage with each said passage disposed internally of said plate and opening to external environs through said outer peripheral extremity of said plate, which said passages provide branch courses for, respectively, filtered oil flow and unfiltered oil flow, wherein terminal portions of said passages opening through said outer peripheral extremity of said plate are configured to receive fittings for sealably communicating said passages to means for containing a filter medium, and further wherein another terminal portion of said second passage for unfiltered oil flow communicates through an annular face of said annular plate to external environs and further wherein another terminal portion of said first passage for filtered oil flow communicates through said inner peripheral extremity of said annular plate to said central opening, annular bushing means configured with a lesser diameter externally threaded portion disposed to extend axially outward from a face of said annular plate and further configured with an internally threaded portion of greater diameter for being received in said central opening of said annular plate, and bushing means being further configured with an outer, enlarged diameter shoulder for being operably disposed in seating contact with said annular plate to obstruct passage of direct communicating flow between said annular plate face and central walled opening, said bushing means being further provided with at least one opening disposed in the wall thereof to provide a port for communicating flow from said first passage to said central opening, said externally and internally threaded portions being complementary in size for enabling said internally threaded portion to be received in place of a spin-on filter during installation on an engine and such spin-on filter being then received on said internally threaded portion, said internally threaded portion being of external diameter at least in part to substantially fay with said central walled opening.

2. The apparatus of claim 1 wherein said annular plate comprises a tension spring loaded openable valve controlling fluid flow through one said non-centrally disposed passage for unfiltered oil flow.

3. The apparatus of claim 1 wherein said plate is provided with an annular sealing gasket means and is configured with an annular groove in one planar face of said plate for operably receiving said sealing gasket means therein.

4. The apparatus of claim 1 wherein calibrated sized opening is provided for communicating said bushing means with said central opening.

5. The apparatus of claim 1 wherein said plate is rotatble about said bushing.

6. The apparatus of claim 1 wherein said plate and said bushing means are unitary.

* * * * *